United States Patent [19]

Pawlowski, Jr. et al.

[11] Patent Number: 5,777,647
[45] Date of Patent: Jul. 7, 1998

[54] SIDE-LOADED PRESSURE REGULATED FREE-INK INK-JET PEN

[75] Inventors: Norman Pawlowski, Jr.; Melissa D. Boyd, both of Corvallis, Oreg.

[73] Assignee: Hewlett-Packard Company, Palo Alto, Calif.

[21] Appl. No.: 611,111

[22] Filed: Mar. 5, 1996

Related U.S. Application Data

[63] Continuation-in-part of Ser. No. 518,847, Aug. 24, 1995, and a continuation-in-part of Ser. No. 331,453, Oct. 31, 1994, Pat. No. 5,583,545.

[51] Int. Cl.$^6$ ............................................................. B41J 2/01
[52] U.S. Cl. ................................... 347/86; 347/87; 347/93
[58] Field of Search .................................. 347/85–87, 6,7, 347/93

[56] References Cited

U.S. PATENT DOCUMENTS

4,475,116  10/1984  Sicking et al. ........................... 347/86
5,367,328  11/1994  Erickson ................................... 347/7
5,453,772  9/1995  Aono et al. ............................. 347/87

*Primary Examiner*—N. Le
*Assistant Examiner*—Craig A. Hallacher

[57] ABSTRACT

The present invention relates to free-ink type ink-jet pens. A dual-chambered housing forms ink accumulators which provide a local supply of ink for a printhead mechanism. The accumulators are fluidically coupled to an off-board ink reservoir by a valve mechanism. A pressure regulator mechanism is incorporated into a chamber for maintaining a predetermined gage set point back-pressure within the pen and for regulating the flow of ink from the reservoir by controlling the valve mechanism. A near linear force by biasing the regulator mechanism so as to balance it against a force exerted thereon by the ambient atmosphere via a vent when the valve mechanism is opened due to a force exerted by a differential between ambient atmospheric pressure and the bias force. The mechanism is insensitive to the rate of flow of ink through the valve.

20 Claims, 9 Drawing Sheets

SIDE-LOADED PRESSURE REGULATED FREE-INK INK-JET PEN

RELATED APPLICATIONS

This application is a continuation-in-part of U.S. patent application Ser. No. 08/518,847, filed Aug. 24, 1995, and a continuation-in-part of U.S. patent application Ser. No. 08/331,453, filed on Oct. 31, 1994 now U.S. Pat. No. 5,583,545, by Pawlowski et al. and its parent, continuation, and divisional cases.

This application is related to U.S. patent application Ser. No. 08/409,255 filed on Mar. 23, 1995 by Seccombe et al., assigned to the common assignee of the present invention, titled APPARATUS FOR PROVIDING INK TO A PRINTHEAD, and its parent, U.S. patent application Ser. No. 08/065,957, and its continuation and divisional cases.

Each of the above cited related cases is incorporated herein by reference in its entity.

BACKGROUND OF THE INVENTION

1. Field of the Invention

The present invention relates generally to ink-jet technology, more particularly to free-ink reservoir type ink-jet pens, and specifically to pressure regulators for a free-ink ink-jet pen.

2. Description of the Related Art

The art of ink-jet technology is relatively well developed. Commercial products such as computer printers, graphics plotters, and facsimile machines employ ink-jet technology for producing hard copy. The basics of this technology are disclosed, for example, in various articles in the *Hewlett-Packard Journal*, Vol. 36, No. 5 (May 1985), Vol. 39, No. 4 (August 1988), Vol. 39, No. 5 (Oct. 1988), Vol. 43, No. 4 (August 1992), Vol. 43, No. 6 (December 1992) and Vol. 45, No. 1 (February 1994) editions, incorporated herein by reference. Ink-jet devices are also described by W. J. Lloyd and H. T. Taub in *Output Hardcopy Devices*, chapter 13 (Ed. R. C. Durbeck and S. Sherr, Academic Press, San Diego, 1988).

Generally, in the thermal ink-jet field, an ink-jet pen is provided with a printhead, having an orifice plate constructed in combination with heating elements. Thermal excitation of ink near nozzles at the orifice plate is used to eject ink droplets through the miniature nozzles and orifices onto a print medium, forming alphanumeric characters or images using dot matrix manipulation. Other types of ink droplet generators, such as the use of piezoelectric transducers, are also known in the art.

The pen itself may have a self-contained reservoir for storing ink and providing appropriate amounts of ink to the printhead during a printing cycle. These self-contained, disposable pens are referred to in the art as print cartridges.

Ink can be stored in a print cartridge in a contained medium, such as a permeable foam material (see e.g., U.S. Pat. No. 4,771,295 (Baker et al.), assigned to the common assignee of the present invention and incorporated herein by reference). Alternatively, the pen can be a free-ink type print cartridge, where the ink is supplied to the printhead mechanism from a self-contained, positive pressure feed ink reservoir such as a biased ink bladder as shown in U.S. Pat. No. 5,359,353 (Hunt et al.), assigned to the common assignee of the present invention and incorporated herein by reference. If a refillable type pen rather than a print cartridge is employed in the hard copy apparatus, ink is generally supplied from an off-board, remote, refillable, ink reservoir to a relatively permanent pen body and printhead mechanism. This is referred to as an off-axis ink supply. Early ink-jet printers used off-axis ink reservoirs as demonstrated in U.S. Pat. No. 4,312,007 (Winfield), assigned to the common assignee of the present invention and incorporated herein by reference. Moreover, it has been found that for some hard copy applications, such as large format plotting of engineering drawings and the like, there is a requirement for the use of much larger volumes of ink than can be contained within a replaceable print cartridge. Therefore, improved, relatively large, off-axis ink reservoir systems have also been developed more recently. As examples, refer to U.S. Pat. No. 4,831,389 (Chan) which shows a multicolor off-board ink supply system; U.S. Pat. No. 4,929,963 (Balazar) which demonstrates an ink delivery system for an ink-jet printer using a low pressure recirculating pumping system; and U.S. Pat. No. 4,968,998 (Allen) which teaches an ink-jet pen which is refillable at a service station (each assigned to the common assignee of the present invention and incorporated herein by reference).

Moreover, an ink-jet pen can be designed to have a substantially permanent printhead mechanism and an on-board (also referred to in the art as on-axis), but detachable, reservoir that can be refilled or replaced as needed.

While both print cartridges and free-ink ink-jet pens provide a reliable and efficient means of "jetting" droplets of ink from the printhead onto the print medium, the printheads generally require a mechanism to prevent the free flow of ink through the orifices when the printhead is not activated. Without such control, ink may leak, or "drool," onto the printing surface or into the printer mechanism. Such leaking ink may also build up and cake on the printhead itself, impairing proper operation. Complex pen service stations are often provided as part of the hard copy apparatus where printheads can be wiped or activated to "spit" away excess ink.

To alleviate this problem, many ink-jet printers supply ink from the reservoir to the printhead at a slight under pressure (also referred to in the art as "back-pressure" or "negative pressure" operation), that is, a gage measured pressure that is lower than the ambient atmospheric pressure at the printhead. To be effective, this pen back-pressure must be maintained consistently and predictably within a desired operating range. That is, the pen back-pressure must be large enough to prevent the unwanted free flow of ink through the orifices when the pen is not in use, yet at the same time small enough so that the printhead, when activated, can overcome the back-pressure and eject ink droplets in a consistent and predictable manner. This back-pressure will be affected by changes in either or both the ambient atmospheric and the internal pressure conditions. Likewise, temperature variations may cause the ink and air within the ink-jet pen to contract or expand, also affecting the back-pressure. Therefore, these factors must be accounted for and a mechanism incorporated into an ink-jet pen design to maintain the back-pressure within the predetermined, desirable operating range.

In an on-axis, foam-based reservoir, print cartridge, the capillary action of the foam will generally be sufficient to create the desired back-pressure. In a free-ink reservoir type ink-jet pen, a variable volume, on-board, ink accumulation chamber supply ("ink accumulator") is often employed. For example, the reservoir may be of a biased, flexible material which can expand or contract, or an ink accumulator chamber may be provided which includes an internal pressure regulating device. In U.S. Pat. No. 4,509,602 (assigned to the common assignee of the present invention and incorporated herein by reference), a spring pulls an ink-filled bladder membrane outwardly to create a slight negative pressure inside the ink reservoir. U.S. Pat. No. 4,677,447 (assigned to the common assignee of the present invention and incorporated herein by reference) describes the use of a check valve in a printing device with an on-board ink reservoir that maintains a constant pressure difference between the ink reservoir and the ink-jet printhead. U.S. Pat. No. 4,992,802 (assigned to the common assignee of the present invention and incorporated herein by reference) teaches the use of two pressure control mechanisms to extend the environmental operating range of an ink-jet pen. U.S. Pat. No. 5,040,002 (assigned to the common assignee of the present invention and incorporated herein by reference) teaches a magnetically-activated valved port for coupling a reservoir and printhead mechanism. Related U.S. patent application Ser. No. 08/065,957 (Seccombe et al.), continued as Ser. No. 08/409,255, describes a diaphragm type pressure regulator located on-board an ink-jet pen using an off-board ink reservoir.

Back-pressure needs to be controlled within a specified tolerance limits so that the printhead can print properly. Print quality fluctuations are directly related to back-pressure fluctuations. Too little back-pressure can lead to poor print quality and ink leakage; too much back-pressure can starve the printhead which will also affect print quality and printhead life since running an ink-jet pen dry can damage the printhead mechanism. The back-pressure needs to be maintained regardless of the printing conditions, but in the prior art has fluctuated as a function of ink level in the on-axis supply or as a function of the ink flow rate through the accumulator and printhead. Therefore, improvements to back-pressure mechanisms are needed to effectuate these contrary operational requirements.

SUMMARY OF THE INVENTION

In its basic aspects, the present invention provides a free-ink, ink-jet pen for use with an off-axis ink reservoir adapted to be coupled to said pen. The pen includes: a housing, having a fluidic coupling between the pen and reservoir; a first ink accumulation chamber, having a first ink accumulation chamber ink inlet for in-flow of ink from the reservoir via the fluidic coupling and a first ink accumulation chamber ink outlet for out-flow of ink from the first ink accumulation chamber; a second ink accumulation chamber, fluidically coupled to the first ink accumulation chamber ink outlet for in-flow of ink from the first ink accumulation chamber, having a second ink accumulation chamber ink outlet for out-flow of ink from the second ink accumulation chamber; a negative pressure printhead mechanism, fluidically coupled to the second ink accumulation chamber, mounted on the housing and having a printhead ink inlet for in-flow of ink from the second ink accumulation chamber; and a regulator for regulating both a predetermined negative pressure set point in the pen and the in-flow of ink from the reservoir into the first ink accumulation chamber.

It is an advantage of the present invention that back-pressure at the pen printhead remains substantially constant despite fluctuations in ink flow rate from a main, off-axis ink reservoir.

It is an advantage of the present invention that an ink-jet pen into which it is incorporated receives ink from a remote, or on-axis but detachable, pressurized reservoir at a constant, steady, printhead back-pressure set point.

it is an advantage of the present invention that use of ink within a supply reservoir is maximized.

It is another advantage of the present invention that it can deliver ink to an ink-jet pen at a relatively high flow rate without greatly affecting back-pressure at the printhead.

It is another advantage of the present invention that back-pressure is controlled over a wide range of flow rates, inlet pressures, and pen orientations with respect to the print media.

It is another advantage of the present invention that the device can be designed with a footprint that makes for easy incorporation into an ink-jet pen mechanism.

It is another advantage of the present invention that the device is designed to be manufacturable with a low part count and insensitivity to tolerance variations, leading to higher production yield and lower part cost.

It is still another advantage of the present invention that ink solvent loss is minimized through the use of a vapor barrier member.

It is a further advantage of the present invention that an ink-jet pen into which it is incorporated can be primed using the device.

It is yet another advantage of the present invention that only one tube fluidic interconnect from the remote ink supply is required, reducing complexity and part count.

It is still a further advantage of the present invention that frictional forces in the pressure regulator device are minimized, thus reducing variation in back-pressure at the printhead.

It is still a further advantage of the present invention that inertial moments and buoyancy effects due to changes in orientation are reduced by designing components with specific gravities approximately equal to the specific gravity of ink.

Other objects, features and advantages of the present invention will become apparent upon consideration of the following detailed description and the accompanying drawings, in which like reference designations represent like features throughout the depictions.

DETAILED DESCRIPTION OF THE INVENTION

Reference is made now in detail to specific embodiments of the present invention, which illustrate the best mode presently contemplated by the inventors for practicing the invention. While the present invention is described in terms of exemplary ink-jet pen structures, it will be recognized by a person skilled in the art that the invention is readily adaptable to other replenishable ink pens and, in fact, many fluid pressure regulating mechanisms. Therefore, no limitation is intended by the exemplary embodiments described nor should any be implied.

Figure 1:
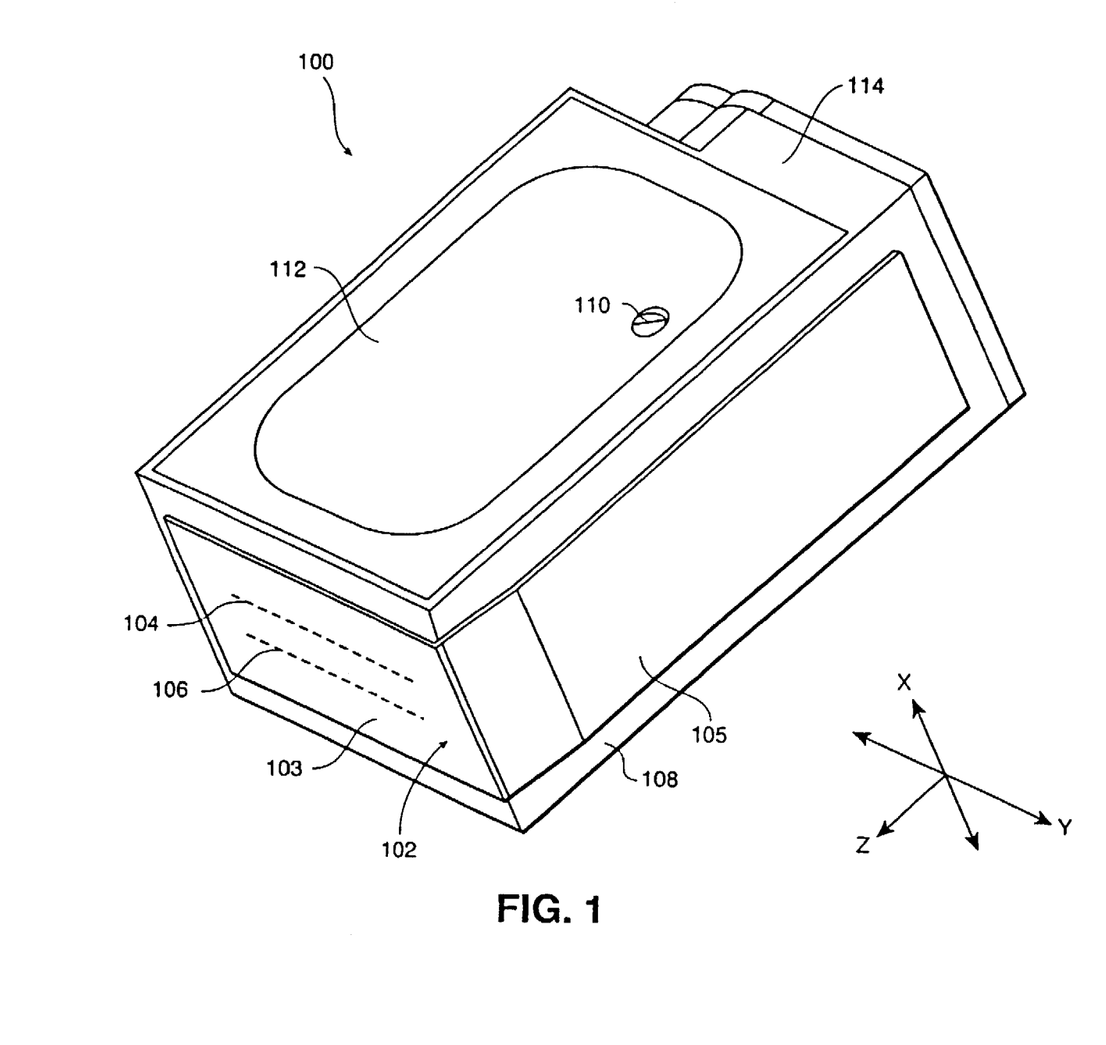
FIG. 1 is a perspective view of a first embodiment of an integrated thermal ink-jet pen in accordance with the present invention.
Figure 1A:
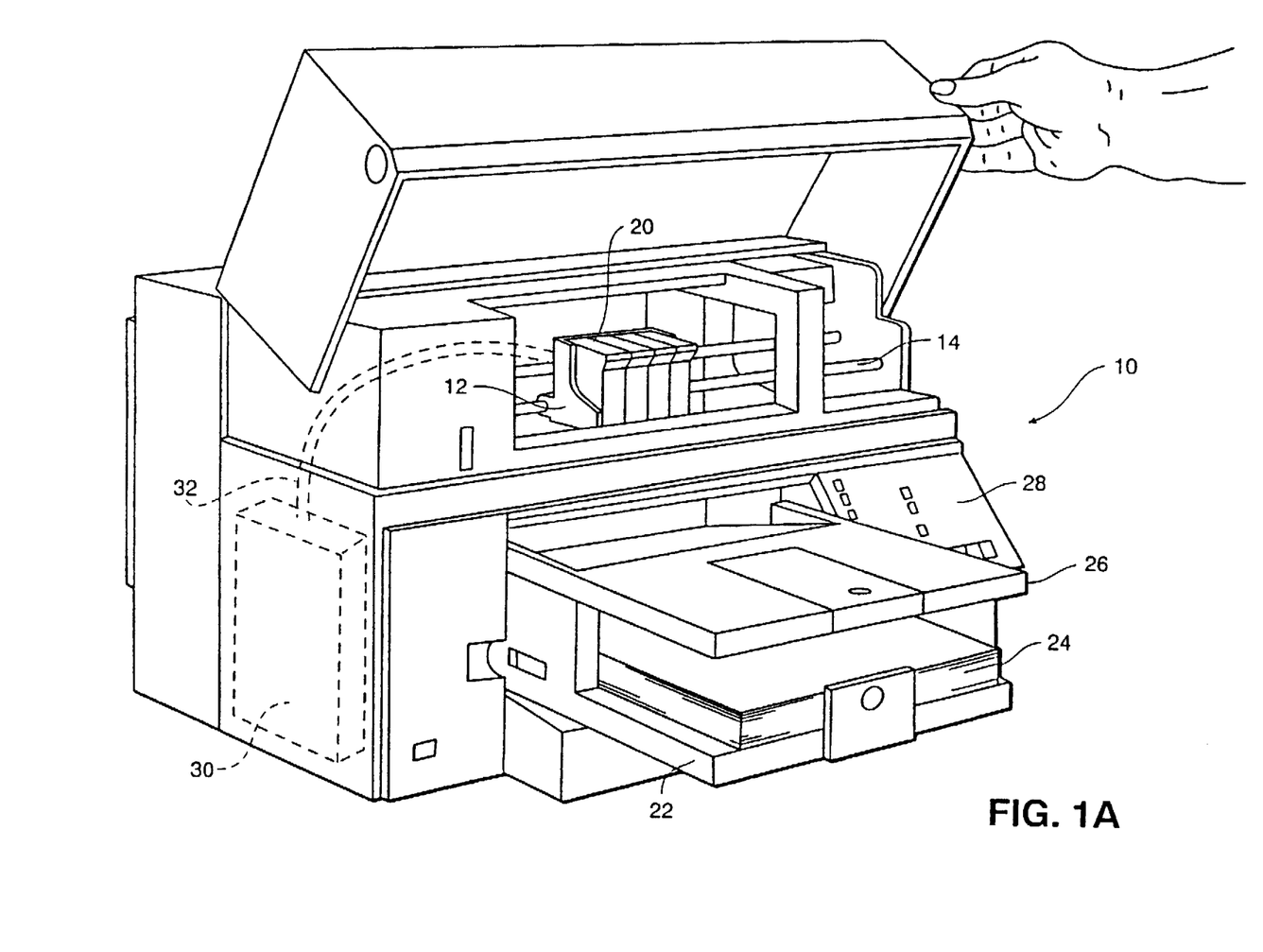
FIG. 1A is a perspective view of an ink-jet hard copy apparatus incorporating the present invention.

FIG. 1A shows an exemplary, small footprint, ink-jet printer 10 incorporating the present invention. A movable carriage 12 is supported on a rail 14. The carriage 12 includes a plurality of compartments for receiving a respective plurality of ink-jet pens 20 (for color printing, one each of cyan, yellow, and magenta ink, and black ink). An input tray 22 is provided for containing a number of sheets of a suitable ink-receiving medium 24 and an output tray 26 for receiving the printed media from the internal printing station subjacent the carriage 12. A user control and status indicator front panel 28 is provided and is electrically connected to the printer controller or host computer (neither shown) as would be well known in the art. An ink reservoir 30 (phantom) is provided within the printer housing coupled to the pens 20 via a tube 32; it will be recognized by those skilled in the art that a variety of off-axis ink supply schemes can be implemented.

Referring now to FIG. 1, an assembled pen 100 in accordance with a first embodiment of the present invention has a printhead assembly 102 having a nozzle plate 103 with an appropriate droplet generator mechanism (not shown) attached thereto and a suitable controller interconnect therefor, such as TAB flex circuit 105. An orifice array of the nozzle plate 103 is shown as having two series of orifices 104, 106. The pen housing 108 is generally form of a molded, rigid plastic. From this perspective a diaphragm vent hole 110 and a labyrinth vent, chassis lid 112 (to be explained in detail hereinafter) are also visible. In operation, the pen 100 would be oriented such that the ink droplets are fired in the Z-axis while the pen 100 is selectively scanned in the X-axis across a print medium (not shown) selectively movable in the plane of the Y-axis.

Figure 2:
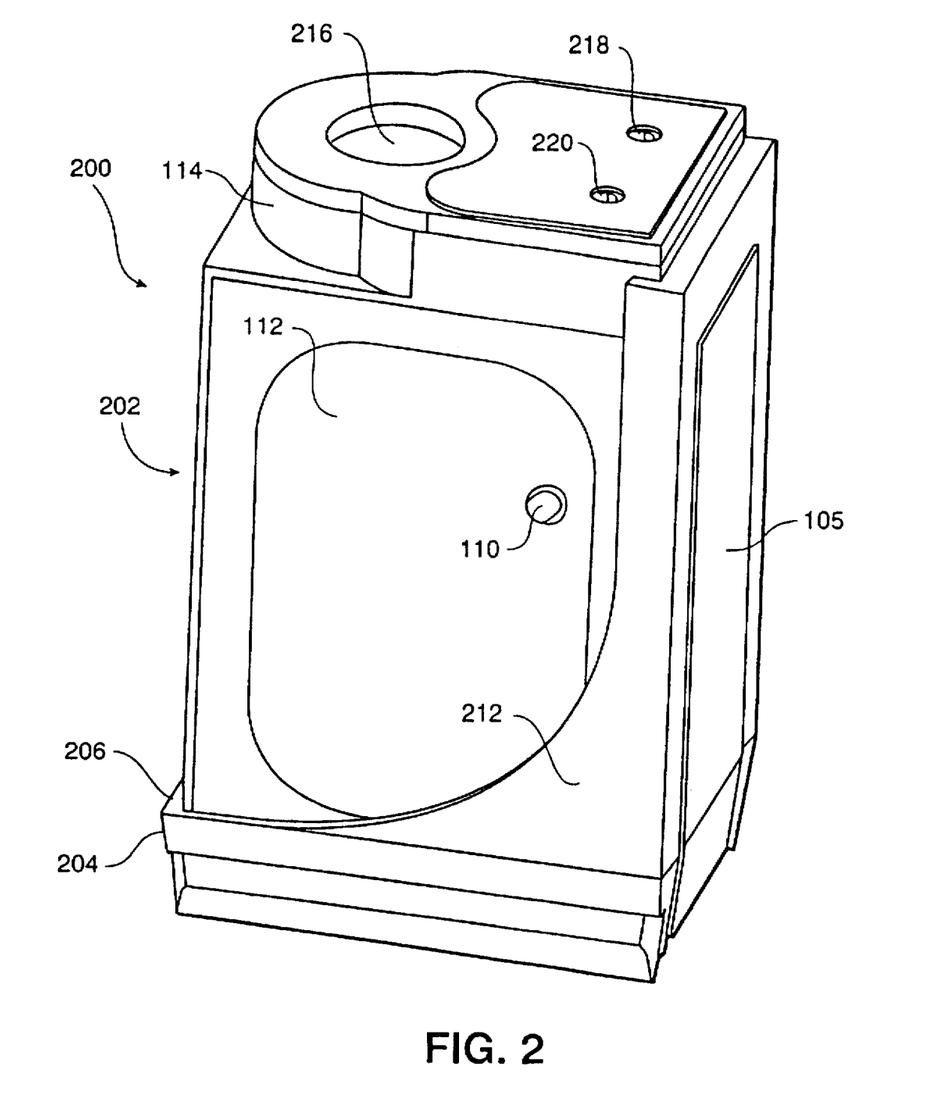
FIG. 2 is a perspective view of a second embodiment of a modular thermal ink-jet pen assembly in accordance with the present invention, having an attachable regulator module and printhead module.
Figure 3:
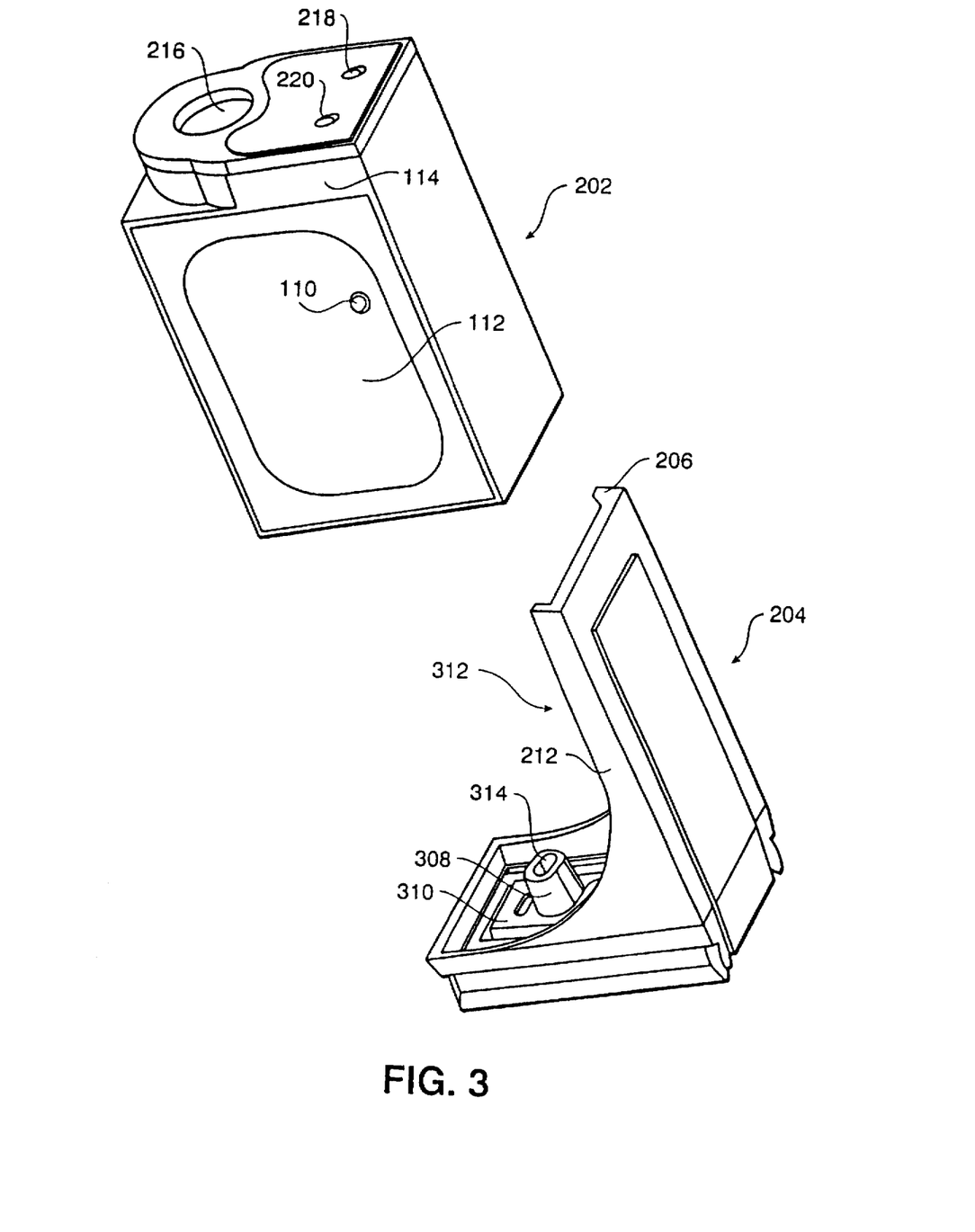
FIG. 3 is an exploded view of the embodiment as shown in FIG. 2.

Looking at FIGS. 2 and 3, a pen 200 in accordance with a second embodiment of the present invention includes a regulator module 202 and a printhead module 204. This permits the two mechanisms to be manufactured and tested separately. Moreover, such a dual element construction permits a relatively permanent regulator module 202 to be adapted for use with a replaceable printhead module 204. In this design, should one or more orifices or ink droplet generators be damaged (such as through dry firing), only the printhead module 204 is replaced, lowering the consumer repair cost. The printhead module 204 includes a raised rim 206 about its periphery such that the regulator module 202 is received in a slip fit manner to assemble the pen 200. An ink standpipe 308 (FIG. 3 only) interiorly located on an ink inlet region of the printhead mechanism 310 (FIG. 3 only) is adapted to insert into an ink outlet port (not seen in this view) of the regulator module 202 as it is slidingly fit along an ascending arm 212 of the printhead module 204 within the raised rim 206 until it is fully received as shown in FIG. 2. The ink standpipe 308 has a central bore 314, allowing ink to flow from the interior of the regulator module into the printhead mechanism 310.

The regulator module 202 of FIGS. 2 and 3 and the assembled pen 100 of FIG. 1 are coupled to an off-axis ink reservoir (not shown) through a septum 216 mounted in a vertically upper most region 114 (hereinafter "regulator crown 114") of the regulator module 202 or the assembled pen 100 (in order to simplify this detailed description and because the interior mechanisms of the regulator are substantively identical in the first and second embodiments, both embodiments will be alluded to in further detailing of the present invention by use of the term "regulator module 202"). A needle valve (not shown) can be inserted through the septum 216 and coupled to the off-axis ink reservoir by a conduit (not shown) such as a plastic tubing that is impervious to the ink chemical structure. The regulator crown 114 also has an ink accumulator air purge port 218 and an ink standpipe air purge port 220, the function of which will be described hereinafter. [The term "air" herein is intended to include both introduced air and vapors outgassed from ink in the system in the form of bubbles.]

Figure 4:
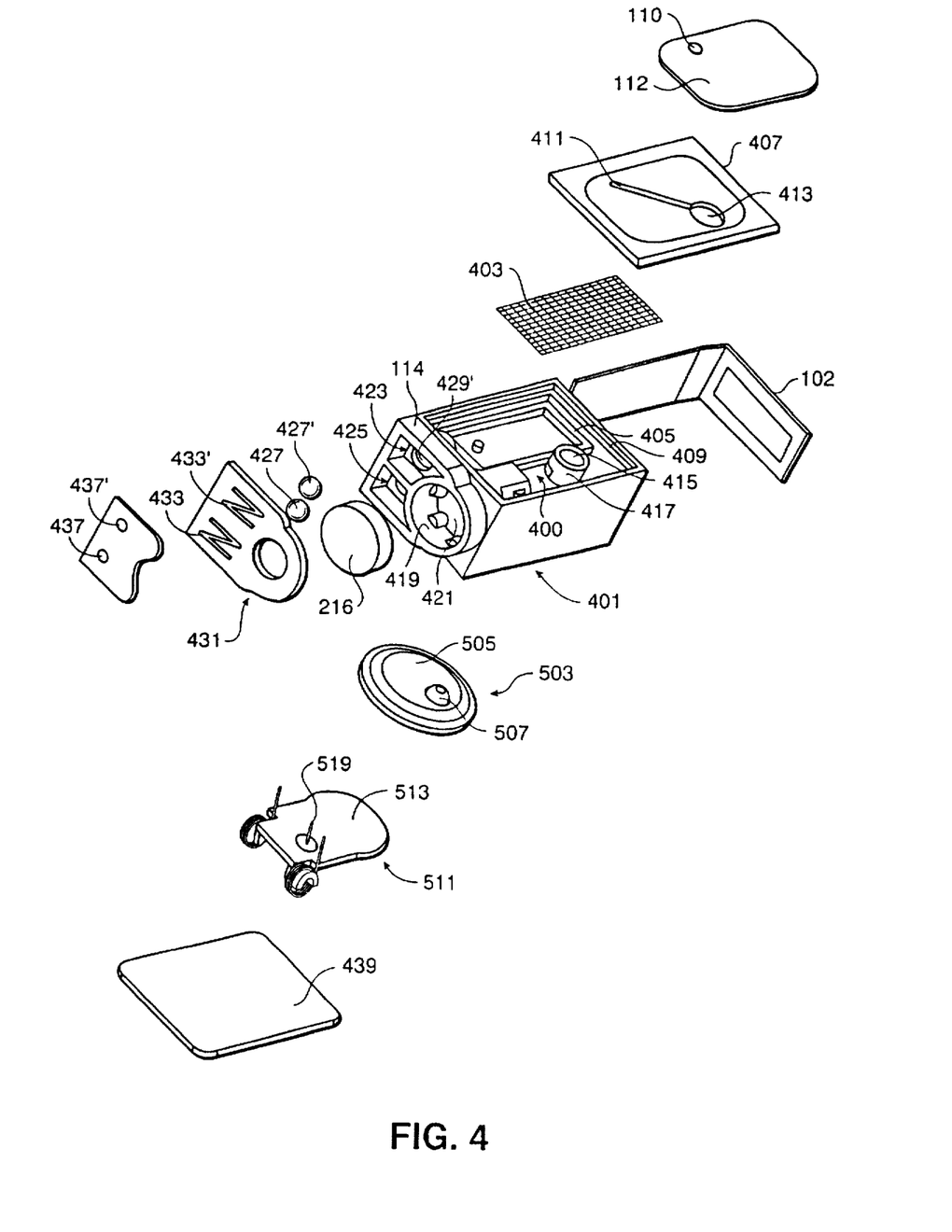
FIG. 4 is an exploded, perspective view of the present invention as shown in FIG. 1.

Turning now to FIG. 4, the regulator module 202 is described in more detail. A regulator chassis 401 is a molded, rigid plastic part, providing ease of manufacture. The various chambers and passageways therein will be further detailed in describing FIGS. 7 and 8 hereinafter. A fine mesh, ink filter screen 403 is adapted to seat on a raised screen mounting rib 405 within a region of the interior of the regulator chassis 401. The screen 403 is fixedly mounted to the rib 405 such as by heat staking or other suitable method as would be known in the art. A screen-side chassis cover 407 is adapted to seat on a chassis ledge 409 protruding inwardly about the entire periphery of the regulator chassis 401 and above the screen mounting rib 405 such that when assembled a gap exists between the screen 403 and the interior surface of the screen-side chassis cover 407 (also demonstrated in FIG. 7). The screen-side chassis cover 407 includes a labyrinth channel 411 and a vent 413 (see also FIG. 1: 112, 110). An extremity of the labyrinth channel 411 distal of the vent 413 opens to the diaphragm vent hole 110 of the labyrinth cover lid 112. The vent 413 is situated to align with a central bore 415 of a diaphragm air boss 417. It has been found that the use of a relatively long, narrow channel, or "labyrinth" channel, reduces vapor loss while leaving any interior chamber of the regulator module 202 coupled to the labyrinth susceptible to ambient atmospheric pressure changes.

With the filter screen 403, screen-side chassis cover 407, and cover lid 110 in place in the assembled regulator module 202, a screen-side ink accumulator chamber 400 is formed within the regulator module 202.

Figure 7:
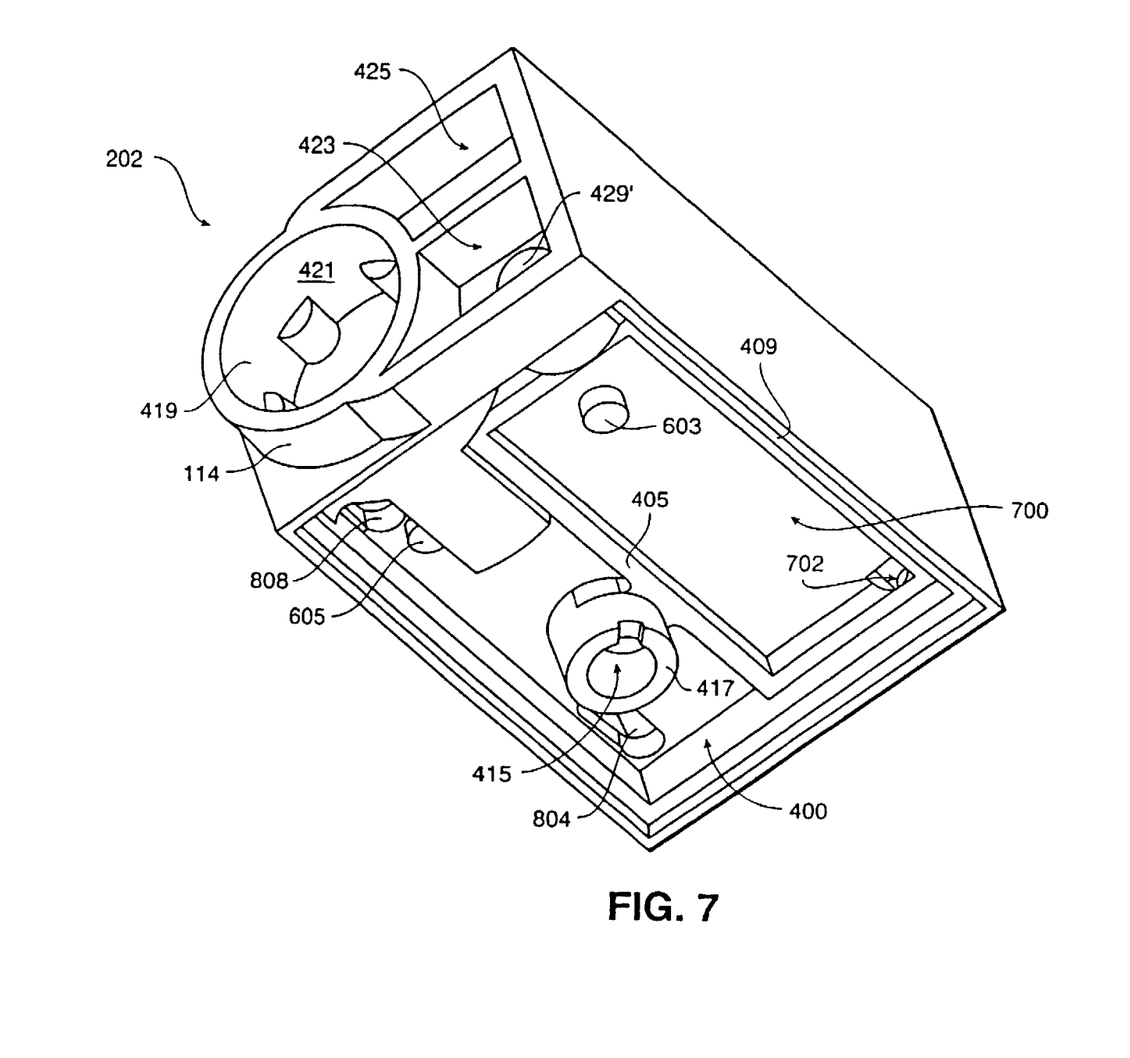
FIG. 7 is a perspective view of the regulator module of the present invention as shown in FIGS. 3 and 4 with housing covers, septum, and filter screen removed.
Figure 8:
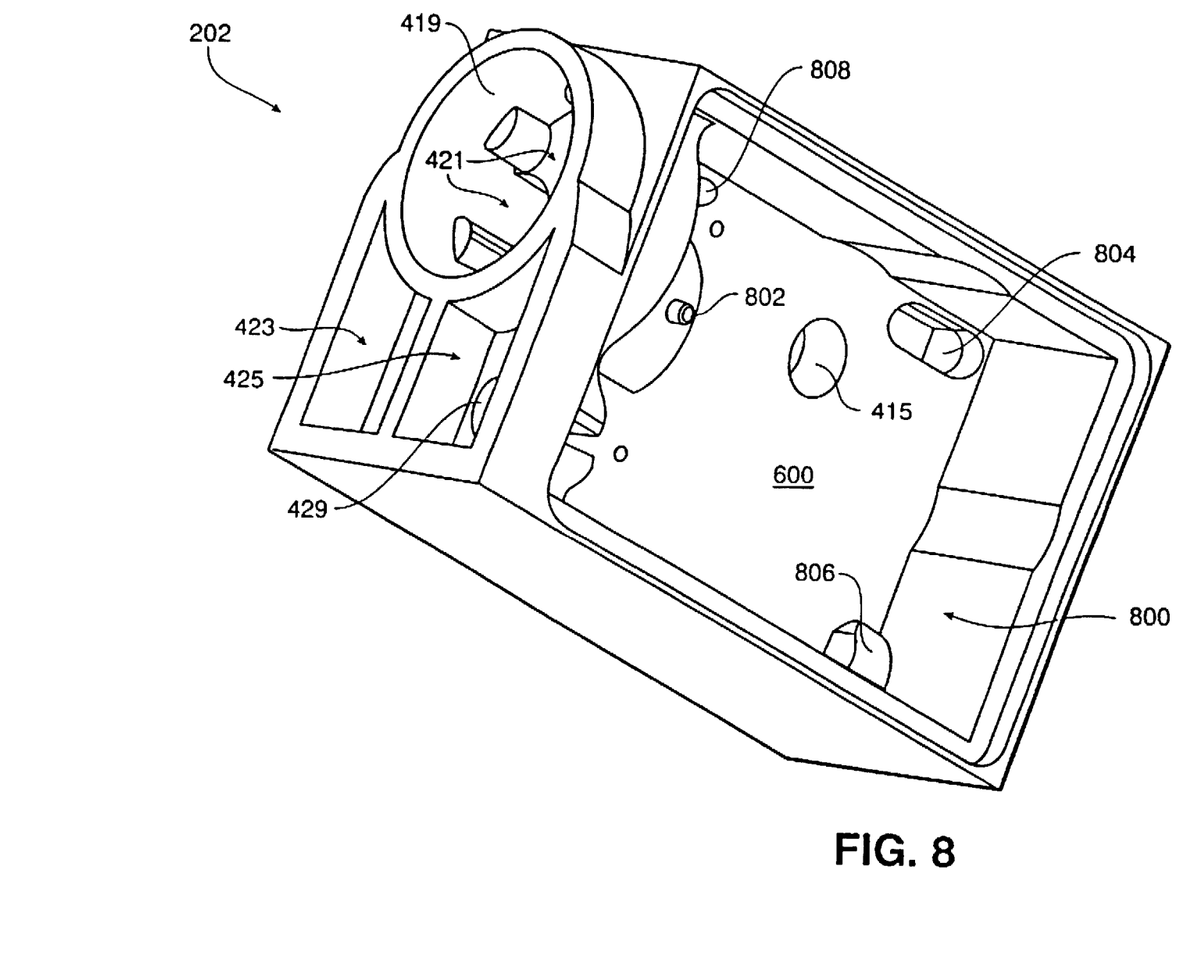
FIG. 8 is a perspective view of the regulator module of the present invention as shown in FIG. 7 from the opposite view and with the diaphragm based, back-pressure regulator mechanism of FIGS. 4 and 5 removed.

Referring to both FIGS. 4 and 7, the regulator crown 114 includes a septum seat 419 forming a septum ink chamber 421 of the regulator module. Two separate chambers are provided: a screen-side, air separation and purge chamber 423 for air bubbles rising in the screen-side ink accumulator chamber 400, and a back-pressure regulation side, air separation and purge chamber 425 for air bubbles rising in the regulator-side ink accumulator chamber 800 as shown in FIG. 8. Air purge mechanisms 427, 427'—such as stainless steel spheres or fine mesh screens as disclosed by the common assignee of the present invention in U.S. patent application Ser. No. 08/519,384, incorporated herein by reference—or check valves, are fit into sockets 429 (FIG. 7), 429' (FIG. 4), respectively. A crown cover 431 includes a labyrinth vent channel 433, 433' for each purge chamber 423, 425. A crown cover lid 435 includes two crown cover lid vents 437, 437', one for each purge chamber 425, 423, respectively. One end of each labyrinth vent channel 433, 433' connects to a respective vent 437, 437' while the other end connects to a respective purge chamber 425, 423.

The regulator module 202 incorporates two, separate, ink accumulator chambers 400, 800 as should now be recognized from a comparison of FIGS. 1 and 8.

Figure 5:
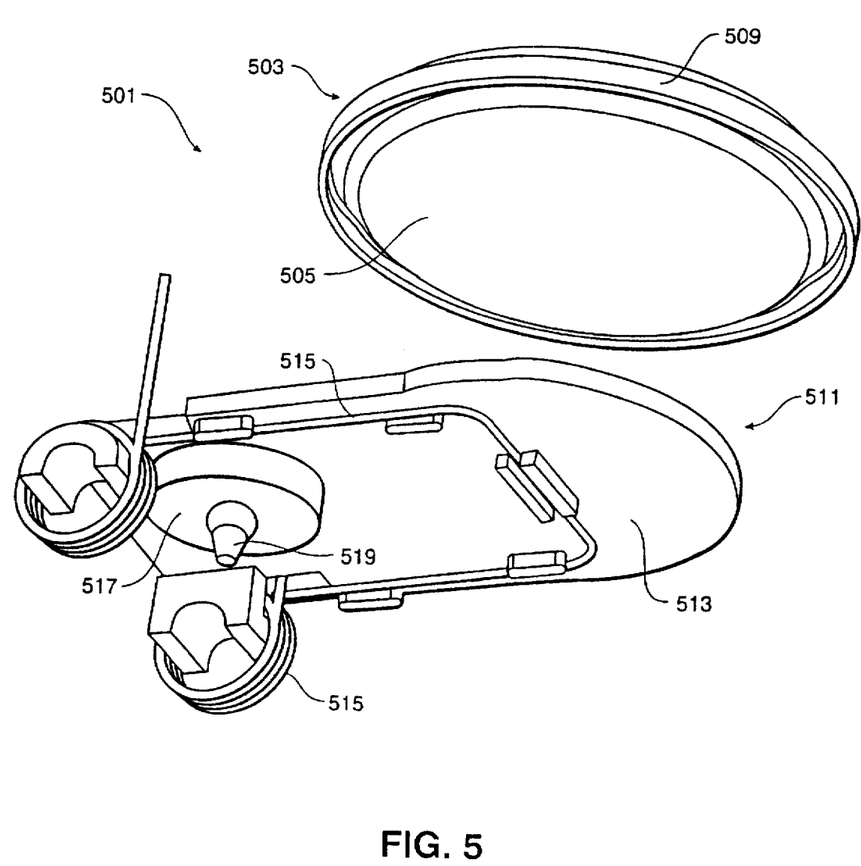
FIG. 5 is an exploded, perspective view of the detail of the diaphragm and the biased lever subassembly as shown in FIG. 4.

A diaphragm based, back-pressure regulator mechanism 501 as shown in FIG. 4 and in more detail in FIG. 5 is mounted in the regulator-side ink accumulator chamber 800. A diaphragm subassembly 503 includes a flexible material (such as PE/tie/PVDC/tie/PE, PE/tie/PVDF/tie/PE, PE/tie/EVOH/tie/PE (where PVDC is polyvinylidene chloride—a DOW™ version is known as SARAN™; EVOH is ethylene-vinyl alcohol copolymer; PE is polyethylene; tie is a layer used to bond the dissimilar materials together; PVDF is polyvinylidene fluoride, also known as KYNAR™; or a low density polyethylene, LDPE, film), inflatable and deflatable bag 505 having a staked perimeter 509 of the bag 505 (FIG. 4 only) adapted to mate, such as with a press fit, within the central bore 415 of a vent air boss 417. Thus, the interior of the bag 505 is vented to the ambient atmosphere via the screen-side cover 407 labyrinth channel 411 and vent 413. In the alternative, a mounting hoop can be used to keep the bag 505 in its predetermined peripheral shape, round as shown in the current embodiment. Note that other flexible members such as diaphragm mechanisms or the like can be substituted for the bag 505 (see e.g., Related Applications).

The back-pressure regulator mechanism 501 further includes a plunger mechanism 511. A lever 513 of the plunger mechanism 511 carries a torsion spring 515 as a biasing mechanism and a valve seat 517 with a needle valve 519 extending through the lever 513. Note that a variety of valving mechanisms can be employed, from a simple open-closed type to a sophisticated flow rate control type. In essence, what is provided as a regulator is a valve mechanism, a valve seat mount, a valve seat, coupled to said valve seat mount and movable to open and close said valve mechanism, and a substantially frictionless, linear force biasing mechanism, coupled to the valve seat mount, for biasing the valve seat to close the valve mechanism with a predetermined biasing force.

The use of a torsion spring has distinct advantages over prior art pressure regulators such as of the type disclosed in U.S. patent application Ser. No. 08/065,957 (Seccombe et al.) which uses a cantilever spring. Back-pressure fluctuations can be related to change in spring force and ink flow rate through the valving mechanism. The ink flow rate through the valving mechanism increases as print density increases. Ideally, a constant back-pressure should be maintained regardless of printing conditions or ink level conditions. This goal is difficult to achieve since a spring-based system is predicated on the relationship:

$$F = k \cdot x,$$

where F is the spring force, k is the spring constant, and x is the amount the spring is deflected. Thus, to reduce the amount the spring force increases for any given deflection, x, the spring constant, k, would need to be reduced. To obtain an acceptable back-pressure set point, the spring must be preloaded accordingly. In the present invention, the spring constant is reduced by use of a torsion spring which provides a means for combining a relatively large number of active coils within a compact space. Preloading thus occurs in a radial direction. Thus, the mechanism is preloaded to a predetermined back-pressure set point without occupying extra internal volume more efficiently used for ink storage.

Figure 6:
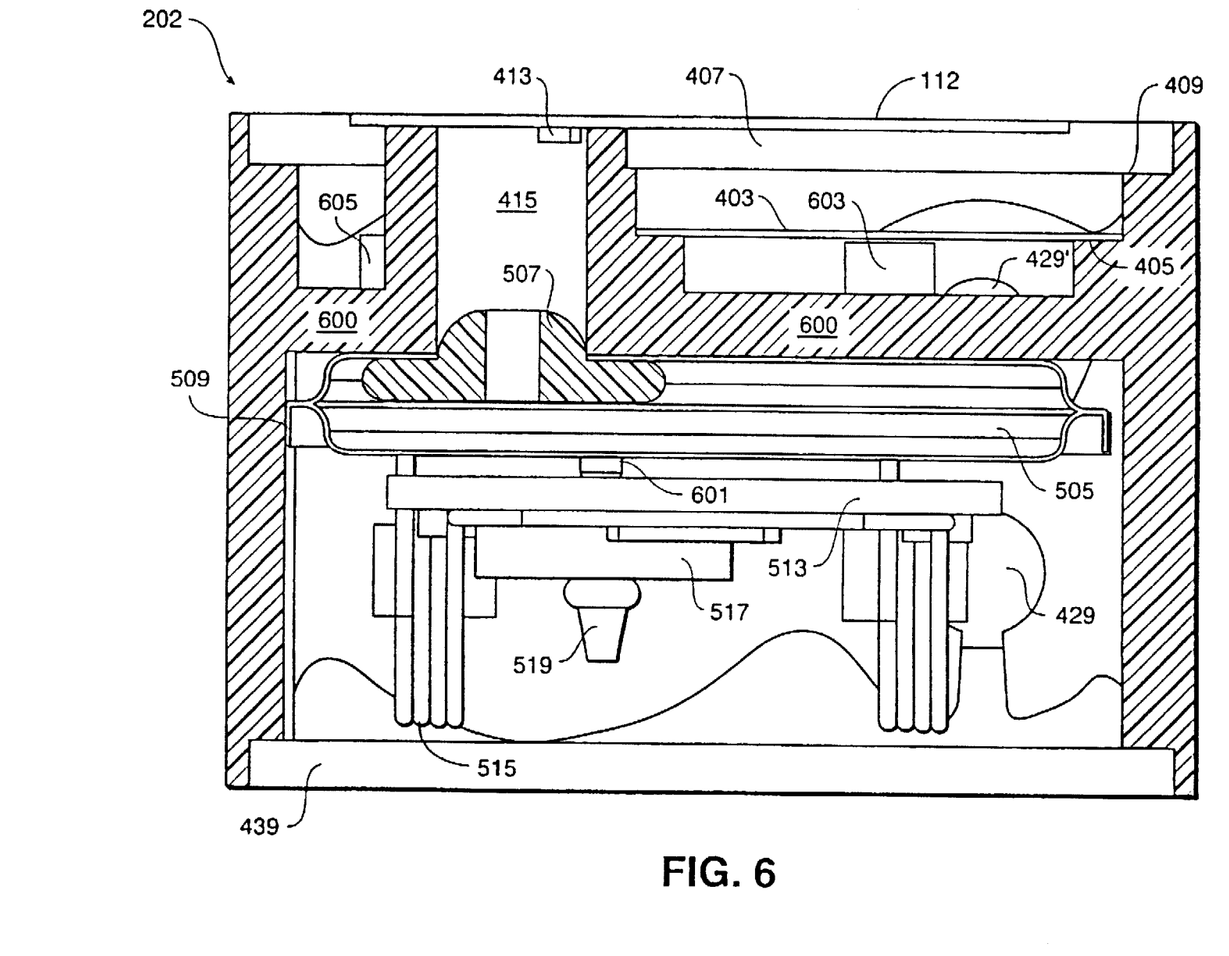
FIG. 6 is a sectional, elevation view of the regulator module of the present invention as shown in FIGS. 3 and 4 from the direction of the printhead module face.

As shown in FIG. 4, the regulator module 202 is completed and made fluid tight with a regulator-side chassis lid 439. A cutaway view of an assembled regulator module looking upwardly from the printhead end, or "bottom," of the pen 100 is shown in FIG. 6. Note that the plunger mechanism 511 is mounted so that the torsion spring 515 biases the inflatable bag 505 and its fitment 501 against the boss 417 and a wall 600 of the regulator module housing 108. Spring bosses 603, 605 receive respective, protruding ends of the torsion spring 515. Valve seat 519 is moved into and out of contact with the ink inlet port 601.

Ink flow through the pen 100 is regulated in accordance with the predetermined back-pressure set point at which the pen is designed to operate, e.g., -2 inches WC (water column) gage pressure. In the state of the art, it is believed that a range of zero to approximately -20 inches WC can be useful, depending upon the specific pen mechanism design structure.

Ink from the off-axis reservoir is fed through a conduit and an appropriate needle through the septum 216 (e.g., FIGS. 2 and 3). As best seen in FIG. 8, ink filling the septum ink chamber 421 will flow through an inlet port 802 from the septum ink chamber 421 into the regulator-side ink accumulator chamber 800. Ink channels 804, 806, 808 through the housing wall 600 allow ink to flow into the screen-side ink accumulator chamber 400. Turning to FIG. 7, as ink fills the screen-side accumulator chamber 400, ink will pass through the ink filter screen 403 (FIG. 4) and into a filtered-ink accumulator chamber 800 of the regulator module 202. An outlet channel 702 fluidically couples the filtered-ink accumulator chamber 700 with the printhead 102 (FIGS. 1, 2, 4), or to the ink standpipe 308 central bore 314 (FIG. 3), and on into the nozzle plate 310 (FIG. 3).

The regulator mechanism is designed with materials that have a combined average specific gravity to nearly that of the ink used in the apparatus. This way, buoyancy forces make the device insensitive to changes in orientation or inertial changes due to motion of the carriage or an external mechanical shock. This effectively makes the device appear as if it had no mass—relative to the ink, that is, the relative mass is approximately zero. Since the device has no apparent mass in the fluid, it will not have a tendency to sink or float. This appearance of "no mass" makes the device robust against vibrational forces. This allows a design for hard copy apparatus without concern about conditions that will cause resonance of the regulator and the valve mechanism to "bounce" open. With no mass, vibrational resonance cannot occur. In turn, this helps to guarantee an even backpressure regulation regardless of the external forces that the pen experiences.

In operation, when the regulator module is full, forces are balanced to the predetermined back-pressure set point such that the regulator mechanism 501 shuts the valving mechanism when the valve seat 517 closes the regulator chamber 800 inlet port 802.

As the pen is fired, the ink supply in the accumulator chambers 700, 400, 800 is depleted. As the ink supply is depleted, the pressure inside the accumulator chambers will fall. As the chamber pressure falls below the set point—ambient atmospheric pressure differential, the diaphragm 223 is flexed into the chamber 203 when the bag 505 starts to fill with air. This fluctuation in pressure differential opens and closes the valving mechanism which lets ink from a pressurized remote reservoir enter the pen and printhead mechanism via the needle and septum mechanism. Forces are balanced in this spring-loaded regulator embodiment since the regulator mechanism 501 creates its force from the pressure differential between the pen's interior ink accumulator chambers 400, 700, 800 and the ambient atmosphere.

Thus, there is provided a side-loaded free-ink ink-jet pen which presents itself to a relatively narrow form factor which in turn can be adapted to a variety of hard copy machines such as a "notebook" portable that uses only one, black ink, pen to a full color printer as exemplified in FIG. 1A to a large scale format drafting plotter which expends large volumes of ink per plot, but which is also easily adaptable to having large, off-axis ink reservoirs.

The foregoing description of the preferred and alternative embodiments of the present invention has been presented for purposes of illustration and description. It is not intended to be exhaustive or to limit the invention to the precise form disclosed. Obviously, many modifications and variations will be apparent to practitioners skilled in this art. As examples, the inflatable bag regulator mechanism may be replaced with another suitable device such as the diaphragm type mechanism disclosed in the parent application hereof; other biasing means other than a torsion spring may be substituted therefor.

Similarly, any process steps described might be interchangeable with other steps in order to achieve the same result. The embodiments were chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A free-ink. ink-jet pen for coupling to an off-axis ink reservoir, comprising:
    a housing, having a means for fluidically coupling said pen to said reservoir; and
    within said housing,
    a first ink accumulation chamber, having a first ink accumulation chamber ink inlet means for in-flow of ink from said reservoir via said means for fluidically coupling said pen to said reservoir and a first ink accumulation chamber ink outlet means for out-flow of ink from said first ink accumulation chamber,
    a second ink accumulation chamber, fluidically coupled to said first ink accumulation chamber ink outlet means for in-flow of ink from said first ink accumulation chamber, having a second ink accumulation chamber ink outlet means for out-flow of ink from said second ink accumulation chamber,
    a negative pressure printhead mechanism, fluidically coupled to said second ink accumulation chamber, mounted on said housing and having a printhead ink inlet means for in-flow of ink from said second ink accumulation chamber, and
    regulating means for regulating both a predetermined negative pressure set point in said pen and the in-flow of ink from said reservoir into said first ink accumulation chamber.

2. The ink-jet pen as set forth in claim 1, wherein said regulating means further comprises:
    valve means for varying ink flow rate and shutting off ink flow from said reservoir into said first ink accumulation chamber when gage pressure in said ink-jet pen is at said predetermined negative pressure set point, and
    biasing means, having a substantially constant bias force during varying ink flow rates from said reservoir into said first ink accumulation chamber, coupled to said valve means for opening and closing said valve means.

3. The ink-jet pen as set forth in claim 2, wherein said biasing means further comprises:
    means for opening and closing said valve means in response to a pressure differential between ambient atmospheric pressure and said predetermined negative pressure set point.

4. The ink-jet pen as set forth in claim 2, wherein said biasing means further comprises:
    a torsion spring having a substantially constant spring force throughout its flex range, and
    at least one flexible member mounted adjacent said torsion spring and coupled to ambient atmospheric pressure such that said flexible member changes orientation within said ink-jet pen in response to the differential between ambient atmospheric pressure and said predetermined negative pressure set point.

5. The ink-jet pen as set forth in claim 1, wherein said regulating means comprises:
    a valve mechanism,
    a valve seat mount,
    a valve seat, coupled to said valve seat mount and movable to open and close said valve mechanism such; that an ink flow rate varies between zero and a predetermined positive flow rate,
    a substantially frictionless, linear force biasing mechanism, coupled to said valve seat mount, for biasing said valve seat to close said valve mechanism at a predetermined biasing force, and
    a flexible mechanism coupled to said valve seat mount and adapted to be deflected when ambient atmospheric pressure is greater than said predetermined negative pressure set point such that said valve mechanism is opened.

6. The ink-jet pen as set forth in claim 1, further comprising:
    said regulating means is mounted within said first ink accumulation chamber in a substantially vertical orientation such that said housing has a narrow form factor.

7. The pen as set forth in claim 1, further comprising:
    said regulating means is constructed to have a specific gravity approximately the same as that of ink contained in said reservoir.

8. The pen as set forth in claim 1, further comprising:
    said negative pressure printhead means is detachable from said housing by having a means for fluidically engaging said second ink accumulation chamber ink outlet means.

9. The pen as set forth in claim 1, further comprising:
    means for filtering ink, within said housing upstream of said negative pressure printhead means, including a third ink accumulation chamber and an ink filter between said second ink accumulation chamber ink outlet means and said third ink accumulation chamber.

10. The pen as set forth in claim 1, wherein said regulating means further comprises:
    an inflatable bag, having an interior cavity coupled to ambient atmosphere through said housing, and biasing means for biasing said inflatable bag such that said predetermined negative pressure set point is established in said printhead mechanism when said first ink accumulation chamber and said second ink accumulation chamber are substantially filled with ink and said first ink accumulation chamber ink inlet means is closed and said first ink accumulation chamber ink inlet means is open when said bag inflates due to a change in the difference between said predetermined negative pressure set point and ambient atmospheric pressure due to depletion of ink in said first ink accumulation chamber and said second ink accumulation chamber during printing with said ink-jet pen.

11. An ink-jet apparatus, comprising:

at least one ink reservoir having a mechanism for supplying ink from said ink reservoir to said ink-jet pen apparatus at a predetermined ink feed pressure; and an ink-jet pen fluidically coupled to said reservoir, the pen further including a pen body having a first ink accumulator chamber and a second ink accumulator chamber, said chambers fluidically coupled to each other, a valving means for fluidically coupling said first ink accumulator chamber to said ink reservoir, an ink-jet printhead mechanism coupled to said pen body and in fluidic communication with said second ink accumulator chamber, and mounted within said first ink accumulator chamber and coupled to said valving means, regulating means for regulating flow of ink into said first ink accumulator chamber from said ink reservoir and said second ink accumulator chamber via said valving means while maintaining a predetermined, substantially constant, back-pressure set point at said ink-jet printhead.

12. The apparatus as set forth in claim 11, wherein:

said regulating means maintains said predetermined, substantially constant, back-pressure set point at said ink-jet printhead mechanism during varying ink flow rates from said ink reservoir into said first ink accumulator chamber.

13. The apparatus as set forth in claim 11, wherein said regulating means further comprises:

biasing means for opening and closing said valving means in response to a force due to a pressure differential between ambient atmospheric pressure and a substantially constant bias force exerted on said valving means by said biasing means.

14. The apparatus as set forth in claim 13, wherein said regulating means further comprises:

a plunger mechanism, coupled to said biasing means, having a valve seat located thereon to open and close said valving means.

15. The apparatus device as set forth in claim 14, wherein said regulating means further comprises:

an inflatable and deflatable bag, coupled to said plunger mechanism and adapted to expand and contract in response to a pressure differential between ambient atmospheric pressure and said substantially constant bias force such that said valving means opens as ambient atmospheric pressure force exceeds said substantially constant bias force.

16. The apparatus as set forth in claim 11, further comprising:

a third ink accumulator chamber fluidically coupling said second ink accumulator chamber and said printhead mechanism, having a means for filtering ink flowing from said second ink accumulator chamber into said printhead mechanism.

17. The apparatus as set forth in claim 11, further comprising:

said pen body including a crown member, and means for purging gases from each of said accumulator chambers located in said crown member.

18. A free-ink ink-jet system comprising:

a selectively attachable and detachable ink reservoir;

a supply of ink within said ink reservoir; and an ink-jet pen having a pen housing having a first ink accumulation chamber with an inlet port means for attaching to and receiving ink from said ink reservoir, a second ink accumulation chamber fluidically coupled to said first ink accumulation chamber, and a vent to ambient atmosphere coupled to said first ink accumulation chamber, a printhead coupled to said pen housing such that ink in said second ink containment chamber is supplied to said printhead mechanism at a predetermined back-pressure set point, a flexible, ink impermeable, pressure-sensing regulator mechanism mounted in said first ink accumulation chamber and coupled to said vent such that said regulator mechanism flexes in response to a predetermined pressure differential between a predetermined negative pressure set point within said pen and ambient atmospheric pressure, a lever, including a means for exerting a predetermined bias thereon, coupled to a surface of said regulator mechanism such that flexing of said mechanism moves said lever against the bias, a valve seat coupled to said lever adjacent said inlet port means such that ink flow from said reservoir is valved by variably moving said valve seat onto and off of said inlet port, and a biasing mechanism coupled to said lever and exerting a near linear force on said lever such that said regulator mechanism is balanced against a force exerted thereon by said ambient atmosphere via said vent at said predetermined back-pressure set point at said printhead at any rate of flow of ink through said valve when said valve seat is moved off of said inlet port due to a force exerted by a differential between ambient atmospheric pressure and said back-pressure.

19. The pen as set forth in claim 18, further comprising:

a third ink accumulation chamber fluidically coupling said second ink accumulation chamber to said printhead mechanism, including means for filtering ink prior to transferring ink from said third ink accumulation chamber to said printhead mechanism such that substantially all impurities and bubbles are eliminated from the ink so transferred.

20. The pen as set forth in claim 19, further comprising: means for purging said gases from said pen.

* * * * *

UNITED STATES PATENT AND TRADEMARK OFFICE
CERTIFICATE OF CORRECTION

PATENT NO. : 5,777,647

DATED : July 7, 1998

INVENTOR(S) : Pawlowski, Jr. et al.

It is certified that error appears in the above-identified patent and that said Letters Patent is hereby corrected as shown below:

At Column 3, line 66, delete "it" and insert in lieu thereof --It--.

At Column 7, line 9, delete "1" and insert in lieu thereof --7--.

At Column 8, line 32, delete "800" and insert in lieu thereof --700--.

Signed and Sealed this

Twenty-second Day of September, 1998

Attest:

BRUCE LEHMAN

*Attesting Officer*    *Commissioner of Patents and Trademarks*